(12) United States Patent
Heinrich

(10) Patent No.: US 6,522,689 B1
(45) Date of Patent: Feb. 18, 2003

(54) MONITORING CIRCUIT FOR A DATA TRANSMISSION NETWORK

(75) Inventor: Peter Heinrich, Rosenheim (DE)

(73) Assignee: STMicroelectronics GmbH, Grasbrunn (DE)

( * ) Notice: Subject to any disclaimer, the term of this patent is extended or adjusted under 35 U.S.C. 154(b) by 0 days.

(21) Appl. No.: 09/330,539

(22) Filed: Jun. 11, 1999

(30) Foreign Application Priority Data

Jun. 12, 1998 (DE) .......................................... 198 26 387

(51) Int. Cl.⁷ .............................................. H04B 17/00
(52) U.S. Cl. ...................................................... 375/224
(58) Field of Search ............................... 375/224, 225, 375/226, 227, 257; 370/241, 242, 245, 247, 249; 324/76.48, 76.39; 714/25, 48; 379/26

(56) References Cited

U.S. PATENT DOCUMENTS

| | | | |
|---|---|---|---|
| 4,385,392 A | * 5/1983 | Angell et al. | .......... 340/825.01 |
| 4,777,645 A | * 10/1988 | Faith et al. | ............... 324/76.39 |
| 5,343,461 A | * 8/1994 | Barton et al. | ............... 370/249 |
| 5,452,308 A | 9/1995 | Kaminski et al. | .......... 371/20.1 |

FOREIGN PATENT DOCUMENTS

DE  42 11 579 C1  11/1993

* cited by examiner

*Primary Examiner*—Don N. Vo
(74) *Attorney, Agent, or Firm*—Lisa K. Jorgenson; E. Russell Tarleton; Seed IP Law Group PLLC

(57) ABSTRACT

A monitoring circuit for a data transmission network having a plurality of transmissive and receptive network nodes and a double-line bus connecting the network nodes and serving for redundant double transmission of digital communications, with a first line (A) and a second line (B) via which communication pulses transferred in the form of time-spaced pulse sequences are transferred in synchronous manner in terms of time slot, a potential change detector is provided by means of which the two lines can each be monitored for the presence of potential change activities and by means of which a condition can be detected in which, during a pulse sequence, potential change activities occur only on the first line, but not on the second line; and a first time measuring circuit is provided by means of which a time measurement of the duration of such a condition can be carried out, and when a predetermined duration of such a condition is exceeded, an error signal is generated.

22 Claims, 1 Drawing Sheet

MONITORING CIRCUIT FOR A DATA TRANSMISSION NETWORK

TECHNICAL FIELD

The invention relates to a monitoring circuit for a data transmission network, and in particular a Controller Area Network ("CAN").

BACKGROUND OF THE INVENTION

One form of a data transmission system is a CAN system. The term CAN stands for Controller Area Network. Information about CAN systems in general can be found in the book "Controller Area Network: CAN" by Konrad Etschberger, Carl Hanser Publishing House 1994, ISBN No. 3-446-17596-2. Of interest in the present context are the sections on Protocol Properties on pages 25 and 26 and Data/Frame Format on pages 37 to 43.

CAN systems are employed for example in the field of motor vehicles.

There is a common supply voltage source for the CAN system, e.g., in the form of a motor vehicle battery delivering for instance a battery voltage of 12 V. Furthermore, each network node has an individual operating voltage source associated with or inherent with each network node, which produces from the supply voltage a regulated operating voltage, e.g., in the amount of 5 V, feeding the respective network node. Each operating voltage source delivers an operating potential at a first terminal and a reference potential, for example ground potential or 0 V, at a second terminal.

At least part of the network nodes can act both as a transmitter and as a receiver. For this purpose such network nodes have a transmitting part and a receiving part.

The transmitting part of such a network node has two resistors and two controllable electronic switches connected to the two lines of the double-line bus. One of these lines is connected via a first one of these resistors to the operating potential (5 V) and via a first one of these switches to the reference potential (0 V). The other line is connected via the second resistor to the reference potential (0 V) and via the second switch to the operating potential (5 V). For transmitting digital communications, the two switches are controlled synchronously either to a conducting state or to a nonconducting state. When the switches are controlled to the non-conducting state, the operating potential is present on one line and the reference potential is present on the other line. This switch state, for example, has the logic value "1" associated therewith. When the switches are controlled to the conducting state, the reference potential is present on one line and the operating potential is present on the other line. This switch state then has the logic value "0" associated therewith.

As the transmitting parts of all network nodes capable of transmission are connected in parallel with respect to the two lines, the potential ratio on the two lines, which is associated with logic value "0", can be produced by closing the two switches of each of the transmissive network nodes. On the other hand, the non-conducting state of the two switches of each network node can be covered up by the conducting state of the two switches of another network node. For this reason, the logic value associated with a closed switch pair (logic value "0") is referred to as dominant and the logic value associated with a non-conducting switch pair (logic value "1") is referred to as recessive.

The receiving part of each network node capable of reception comprises a comparator comparing the respective potentials on the two lines with each other. Upon reception of a recessive bit (logic value "1"), for example, a positive potential is created at the output of the comparator, which has the logic value "1" associated therewith. Upon reception of a dominant bit (logic value "0"), a potential corresponding to the reference potential is present at the output of the comparator, which then has the logic value "0" associated therewith. The comparator thus constitutes a decoder for the potential relationships corresponding to the respective transmitted bit on both lines.

For reasons of redundancy, the two lines are used in addition to system ground. The message information corresponding to the potential value of the respective bit transmitted is thus transferred both via the one line and via the other line. In case of failure of one of the lines, the further transmission operation can be restricted to the non-failed line. For detecting line failures, two additional comparators can be provided, one thereof comparing the potential of one line and the other one thereof the potential of the other line with a mean potential that is between the operating potential and the reference potential.

There can occur different line failures or line faults or errors, for instance, in the form of short-circuits between the two lines, short-circuits towards system ground, short-circuits towards the operating potential source, short-circuits towards the supply voltage source or in the form of open lines. There are line errors that do not hinder secure decoding of the communications transmitted. There are other line errors against which specific measures need to be taken in order to still render possible correct decoding. More details in this respect can be found in DE 195 23 031 A1.

In a CAN network, the messages or communications are transferred in the form of pulse sequences or frames spaced apart in time. The usual CAN protocol provides that a minimum distance in time is present between the individual frames, that within one frame there must be no more than a predetermined number of successive recessive or dominant bits, and that all receptive network nodes confirm reception of the respective pulse sequence by sending a confirmation pulse during a predetermined time slot (in the following referred to as confirmation time slot), which is the same for all network nodes, at the end of the respective pulse sequence. Issuing of the conformation pulse takes place by controlling the second switch in each confirming network node to the conducting state.

When the line connected via its resistor to the reference potential has a short-circuit towards system ground, the network-node-inherent operating potential sources (5 V) of all confirming network nodes are shorted via the respectively associated second switch and are shorted via this short-circuit to system ground. As a result thereof, a high current pulse flows across the shorted line during such a confirmation time slot. When the CAN network has, for example, 40 receptive network nodes and when the network-node-inherent operating voltage source of each of these 40 network nodes delivers a current of 200 mA to the shorted line, a total current pulse of 8 A arises on this shorted line during the confirmation time slot.

Such high current pulses not only constitute a burden for the supply voltage source, but can also cause disturbances in the data transmission network. During the high shorting current, inductive energy is stored in the line inductance of the shorted line, which upon opening of the second switches of the confirming network nodes is discharged in the form of a voltage pulse on the shorted line. This voltage pulse can affect the non-shorted other line by cross-talk and may cause an interference pulse there. This interference pulse is erroneously interpreted as a communication bit, and the last frame transmitted is rated as having not been transmitted correctly, which causes repeated transmission of this frame. When the line short-circuit is still present during the confirmation time slot for this repeatedly sent frame, a high current pulse again results on the short-circuit line, and as a consequence thereof a new interference bit is created on the non-shorted line and renewed repeated transmission of the already repeated frame is caused. This continues on and on, and the data transmission network remains captive in this loop.

SUMMARY OF THE INVENTION

The invention provides a monitoring circuit for a data transmission network, comprising a plurality of transmissive and receptive network nodes and a double-line bus connecting the network nodes and serving for redundant double transmission of digital communications and having a first line and a second line via which communication pulses transferred in the form of pulse sequences spaced apart in time are transmitted in synchronous manner in terms of time slot. In doing so, at least part of the network nodes confirm reception of the respective pulse sequence by sending a confirmation pulse during a predetermined line slot that is the same for all network nodes. In at least part of the network nodes, the first line is connected via a first resistor to a network-node-inherent operating potential source and via a first controllable switch to a reference potential source, and the second line is connected via a second resistor to the reference potential source and via a controllable second switch to the operating potential source. The two switches are simultaneously controlled to the non-conducting state for transmission of a communication pulse having a first logic value and simultaneously controlled to the conducting state for transmission of a communication pulse having a second logic value. There is provided a potential change detector through which the two lines can each be monitored for the presence of potential change activities and by means of which a condition can be detected in which potential change activities occur during a pulse sequence only on the first line, but not on the second line. Furthermore, there is provided a first time measuring circuit through which a time measurement of the duration of such a condition can be carried out and by means of which, upon exceeding of a predetermined duration of such a condition, an error signal can be generated on the basis of which the second switches of at least part of the network nodes can be controlled to the non-conducting state.

In the monitoring circuit according to the invention, the two lines are each monitored separately with respect to the presence of potential change activities. In case a non-symmetrical potential change activity is ascertained in which potential change activities take place only on the first line, but not on the second line, it is assumed that a line error in the form of a short-circuit of the second line towards system ground can be present. In case of determination of such a non-symmetrical potential change activity, an error signal is, however, not generated immediately, but only after such a non-symmetrical potential change activity has taken place for a predetermined period of time. To this end, there is provided the first time measuring circuit producing an error signal at its output only when this period of time has been exceeded. In accordance with this error signal, the second switches of all receptive network nodes or at least part of the receptive network nodes are controlled to the non-conducting state. This prevents in all such network nodes that the respective operating voltage source thereof delivers a short-circuit current to system ground via the shorted line.

A non-symmetry with respect to the potential change activities on two lines may also be caused by isolated interference pulses on only one of the two lines. By means of the first time measuring circuit such interference pulses, in case of occurrence on the first line only, are prevented from triggering the error signal and thus initiating switching of the second switches to the non-conducting state. The measuring duration of the first time measuring circuit is selected such that successive interference pulses up to a predetermined number, for example up to the number of three, can not yet trigger the error signal. Thus, inactivity masking with respect to such interference pulses takes place.

In a preferred embodiment the first time measuring circuit is composed of an up/down counter that counts potential changes on the first line in an upward direction and potential changes on the second line in downward direction and that issues an error signal upon reaching a predetermined count, for example greater than three. As long as both lines display an equal number of potential changes, which is the case with an error-free bus, upward and downward counting operations alternate in succession, so that the predetermined count of, for example, three is not reached. In case a short-circuit on the second line towards system ground takes place, as of which potential changes still are reported by the first line only, the up/down counter performs only down-counting operations, and after three potential changes on the first line it reaches the predetermined count resulting in an error signal being issued at the output of the up/down counter.

The potential change detector may have two comparators by means of which the potentials of the two lines are each compared with a mean potential lying between the operating potential and the reference potential. The comparator monitoring the first line is coupled with the up-counting input and the comparator monitoring the second line is coupled with the down-counting input of the up/down counter.

Between the two comparators and the two counting inputs of the up/down-counter there is preferably provided one differentiating member each by means of which potential changes are converted to countable pulses. The differentiating members can be designed to have a rectifying effect so that each potential change can become a countable pulse.

When the up/down counter has reached the predetermined count at which it issues an error signal, this error signal is maintained irrespective of whether or not the underlying line error is still present. This may be intended, for example, for being able to determine at a time of inspection or diagnosis that such an error had occurred even though it is no longer present at the time of inspection or diagnosis.

In another embodiment it is repeatedly examined whether or not the line error is still present. For example, a short-circuit of a line towards system ground each time can occur for a short period of time only, for example, when a line having a rubbed-off insulation briefly touches system ground only in case of extreme vibrations of a motor vehicles, while it is remote from system ground for most of the time.

For this purpose, an embodiment of the invention provides a circuit through which, at the beginning of each new pulse sequence or a new (message) frame, an examination is made as to whether or not the line error ascertained during the preceding frame is still present. For this purpose, there may be provided a resettable second time measuring circuit having the error signal applied to the input side thereof and configured to output a switch control signal that switches the second switches to the non-conducting state, being reset a predetermined duration after the end of the frame, and, starting from the respective resetting time, masking a possibly existing error signal for a predetermined measuring duration. This means that an error signal that is still present at the time of resetting can initiate the switch control signal again when the error signal is still present after expiration of the measuring duration of the second time measuring circuit. During this measuring duration, the up/down counter is down-counting below the count triggering the error signal when the line error is not present at the beginning of the next frame.

The second time measuring circuit can be constituted by a counter having a clock input connected to a counting clock source, and having a counting release input serving to have the error signal applied thereto. Only when this counter, after resetting thereof, performs up-counting to a specific count as the counting release input thereof has been fed with the error signal for a correspondingly long duration, will the switch control signal be issued at the output thereof.

In order to provide, in case the line error considered is not present at the beginning of a new frame, that the up/down counter, within the masking time of the second time measuring circuit, can perform rapid and secure down-counting from the count on the basis of which it has issued the error signal during the preceding frame, an embodiment of the monitoring circuit according to the invention provides a priority circuit between the potential change detector and the counting inputs of the up/down counter. When both counting inputs are fed with potential change pulses because both lines again display potential change activities, the effect achieved by this priority circuit is that down-counting according to the potential change activity of the previously error-inflicted line now has priority over up-counting according to the potential change activity of the other line.

For detecting the respective frame end, there may be provided a third time measuring means, to which are signalled changes in potential difference between the two lines and which upon each signalled potential difference change can be reset to an initial state. When a predetermined duration is exceeded as of the last resetting operation without a new resetting taking place, it is assumed that the end of respective frame has been reached, and the third time measuring circuit issues a resetting signal by means of which the second time measuring circuit is reset. In this manner, the second time measuring means is brought to its masking time measuring state before the beginning of each new frame, within which the error signal is not converted by the first time measuring means to a switch control signal for switching the second switches of the receptive network nodes to the non-conducting state.

The third time measuring means can be comprised of a third counter, which at a counting clock input is fed with counting clocks and which at a resetting input receives as a resetting signal the signal for potential difference changes on the two lines. Preferably, the resetting input of the third time measuring means also has a differentiating member connected upstream thereof, which preferably operates in a rectifying manner in order to convert each signalled potential difference change to a pulse.

BRIEF DESCRIPTION OF THE DRAWINGS

Further objectives and advantages of the invention will be elucidated now in more detail by way of embodiments with reference to the attached drawings in which.

DETAILED DESCRIPTION OF THE INVENTION

Figure 1:
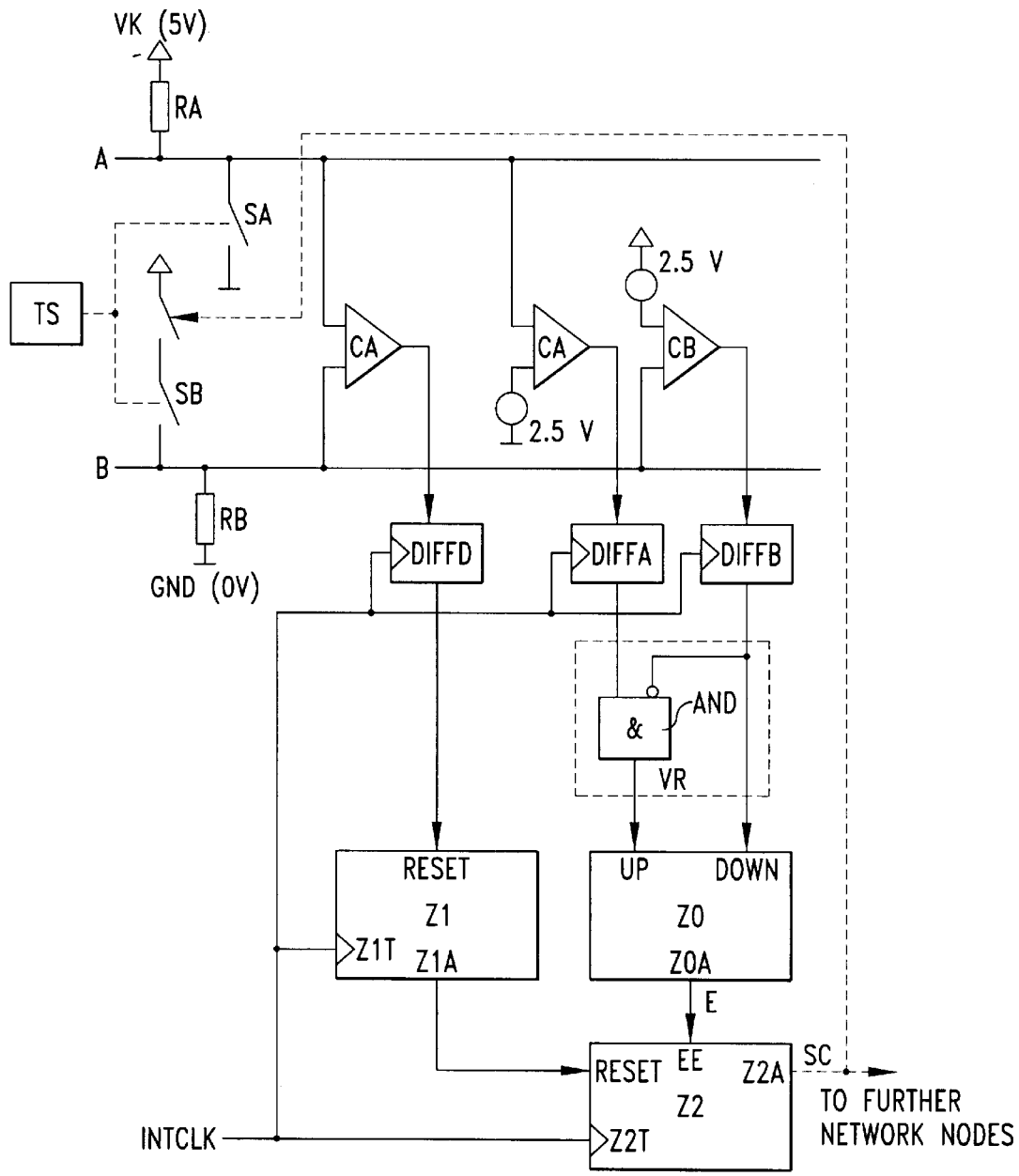
FIG. 1 shows a block circuit diagram of a network node of a CAN system with a monitoring circuit.

The embodiment shown in FIG. 1 comprises a double-line bus having two lines A and B of a CAN system. This system comprises a plurality of network nodes. FIG. 1 shows circuit components of only one single network node. The further network nodes are composed at least in part in identical manner.

The first line A is connected via a first resistor RA to a network-node-inherent operating potential source VK (for example 5 V), whereas the second line is connected via a second resistor RB to a reference potential source GND (for example 0 V). Furthermore, the first line A is connected via a first switch SA to the reference potential source GND and the second line B is connected via a second switch SB to the reference potential source VK. The two switches are simultaneously controlled either to a conducting state or to a non-conducting state by a transmission signal source TS. In the non-conducting state of the two switches SA and SB, the reference potential VK, for example 5 V, is present on line A and the reference potential, for example 0 V, is present on line B. Associated with these switch and potential states are the term "recessive" and the logic value "1". When switches SA and SB are switched to the conducting state, first line A is at reference potential (0 V) and second line B is at operating potential (5 V). These switch and potential states have the term "dominant" and the logic value "0" associated therewith. In case of a logic value change of the binary communication signal transmitted via the double-line bus, a potential change thus takes place on both lines from 5 V to 0 V and from 0 V to 5 V, respectively. Due to the synchronous control of both switches SA and SB, communication pulses are transmitted on the two lines A and B in synchronous manner in terms of time slot, but in opposite manner in terms of amplitude.

The potentials on both lines A and B are determined by the switching states of both switches SA and SB of all network nodes involved. The non-conducting switch state of both switches SA and SB of one or several network nodes can be overridden by the conducting switch position of both switches SA and SB of one or several other network nodes. For this reason, the non-conducting state of both switches SA and SB of a network node is referred to as recessive and the conducting switching state thereof is referred to as dominant.

The receiving part of the respective network node comprises a potential change detector means in the form of a comparator CD, by means of which the difference between the potential on line A and the potential on line B is formed. When line A has a higher potential than line B, logic value "1" appears at the output of comparator CD, otherwise the logic value "0". A recessive state or logic value "1" on the double-line bus thus has a logic value "1" associated therewith at the output of the comparator CD, whereas in case of a dominant state or logic value "0" on the double-line bus, a logic value "0" appears at the output of comparator CD. Comparator CD thus serves as a decoder for the communications transmitted in the form of the potentials described via the double-line bus.

Each network node has an operating voltage source of its own, which is obtained as regulated voltage from the supply voltage source common to the entire data transmission system, for example a motor vehicle battery. The supply voltage source has a system ground associated therewith, which in the case of a motor vehicle is in the form of metal material in the car frame and body. The reference potential GND of the network-node-inherent operating voltage source usually is equal to system ground potential, namely 0 V. When looking at an on-board car CAN network, the two lines A and B of the double-line bus usually are routed along car body parts. It may happen then that a short-circuit of line A and/or line B arises towards system ground, for example as a result of fraying of the insulation of the line concerned.

According to the protocol already mentioned, which holds for example for CAN networks, communications transmitted are transferred in the form of pulse sequences or (pulse) frames which have a prescribed minimum distance in time from each other and within which there must be no more than a prescribed number of successive bits having the same logic value. Moreover, this protocol provides that at the end of a transmitted frame, all receptive network nodes issue a confirmation pulse during a predetermined confirmation time slot that is equal for all network nodes. This leads to the previously described problems when a line error is present in such a manner that line B has a short-circuit towards system ground, since in that case all network-node-inherent operating voltage sources VK during the confirmation time slot then deliver current towards system ground via the shorted line.

The invention described herein is directed to overcoming the problems associated with this line error, and not with all other line errors that may occur in such a data transmission network.

When there is a short-circuit of line B towards system ground, and the line system is in order as regards line A, potential changes between 5 V and 0 V continue on line A, while line B, during the duration of the short-circuit towards ground, permanently remains on the potential of 0 V. Along with the potential changes on line A, changes between the logic values "1" and "0" still occur at the output of comparator CD, so that decoding of the transmitted communication is still taking place. Because it is not possible to gather from the output signal of comparator CD that a line error in the form of a short-circuit of line B towards system ground is present, the monitoring circuit shown in FIG. I is provided with two additional comparators CA and CB. CA determines potential change activities on line A, and CB determines potential change activities on line B. CA and CB compare the potential of line A and line B, respectively, with one mean potential each that is between operating potential and reference potential and, for example, is 2.5 V. When the double-line bus is error free, the outputs of both comparators CA and CB deliver the same output signal pattern as comparator CD, namely a logic value "1" in case of a recessive state or logic value "1" on the double-line bus, and a logic value "0" in case of a dominant state or logic value "0" on the double-line bus. In the case of a short-circuit of line B towards system ground, the outputs of comparators CD and CA still deliver such a signal pattern with alternating logic values "1" and "0", while the output of comparator CB remains permanently on logic value "1" during the duration of the short-circuit.

In addition thereto, the monitoring circuit comprises three differentiating members DiffA, DiffB and DiffD, the inputs of which are connected to the output of comparator CA, to the output of comparator CB and to the output of comparator CD, respectively. By means of these differentiating members, the potential change edges in the output signal of the respectively associated comparator are converted to pulses. On the basis of a circuit construction described in more detail hereinafter by way of FIG. 2, the differentiating members both have a differentiating effect and a rectifying effect, so that all potential changes or all edges in the output signal of the respectively associated comparator lead to output pulses of like polarity at the output of the respective differentiating member.

The outputs of differentiating members DiffA and DiffB are connected via a priority circuit VR to a down-counting input "down" and an up-counting input "up", respectively, of an up/down counter Z0. The latter comprises a counting signal output Z0A connected to a counting release input EE of a second counter Z2. The latter comprises a counting clock input Z2T, a resetting input RESET and a counter output Z2A. The resetting input RESET of Z2 is connected to a counter output Z1A of a third counter Z1, which has a resetting input "reset" and a counting clock input Z1T. Its resetting input "reset" is connected to the output of differentiating member DiffD. The counting clock inputs Z1T and Z2T of the counters Z1 and Z2 are fed with an internal clock signal INTclk, which is preferably produced in the respective network node proper.

The up/down counter Z0 constitutes a first time measuring means, the counter Z2 constitutes a second time measuring means and the counter Z1 constitutes a third time measuring means.

The priority circuit VR comprises an AND element "AND" having a non-negating input connected to the output of DiffA, a negating input connected to the output of DiffB, and an output connected to the up-counting input "up" of Z0. The down-counting input "down" thus is connected directly to the output of DiffB, whereas the up-counting input "up" is connected via the AND element "AND" only indirectly both to the output of DiffA and to the output of DiffB.

The signal occurring at the counter output Z2A of counter Z2 serves as switch control signal SC which controls the second switches SB preferably of all receptive network nodes to a non-conducting state in the event that line B displays a short-circuit towards system ground.

A practical embodiment considering the CAN protocol is designed such that the up/down counter Z0, when reaching a count of more than three at its counter output Z0A, issues an a error signal E, that counter Z2, when exceeding a count of, for example, 114, delivers a switch control signal SC controlling second switch SB to the non-conducting state, and such that counter Z1, when exceeding a count of, for example, 200, issues a resetting signal R at counter output Z1A thereof. In this embodiment, the duration of a bit of the communication pulse sequence corresponds to the duration of 10 counting clock pulses. In this case, third counter Z1 issues resetting signal R at its output only after a period of time has been exceeded since the last potential difference change signalled thereto that corresponds to the duration of 20 bits. In this example, the time masking by the second counter Z2 has the effect that, starting as of resetting thereof, the error E reported thereto from first counter Z0 must have a longer duration than the duration of 11 bits in order to generate the switching control signal that switches the second switches SB to the non-conducting state.

The counts of counters Z1 and Z2, respectively, which trigger the resetting signal R and the switching control signal SC, respectively, are selected in consideration of the specific protocol of the data transmission network in which the monitoring circuit finds application.

In the following, the mode of operation of the circuit shown in FIG. 1 is described.

Counter Z1 reaches a count of 200 when a period of time has passed since the last resetting potential change activity on the double-line bus which corresponds to 20 communication bits. In accordance with the CAN protocol, there must not be more than 11 successive bits having the same logic values during one communication frame, i.e., during a frame, a potential change break or interval must not be greater than a duration corresponding to 11 bits. When a count of 200 has been reached since the last resetting of counter Z1, which corresponds to a duration of twenty communication bits, it is thus assumed that a frame interval is present at the time when count 200 is reached. Counter Z2 is reset at this time and prepared for the beginning of a new frame. Since counter Z1 is reset again only at the beginning of a new frame, the output signal thereof keeps counter Z2 reset up to such a new frame beginning. Counter Z2 thus is released for a new counting operation only when counter Z1 is reset at the beginning of a new frame. Counter Z2 thus masks a possibly still existing error signal E at the output of counter Z0 for a duration which commences with the respective frame and corresponds to the duration of 114 clock pulses of the internal clock signal INTclk or a duration of 11.4 communication bits. Only when error signal E is still issued by counter Z0 after this period of time of 114 clock pulses, is the assumption made that the error still is present also during this new frame, and the second switches SB of the network nodes again will be switched to the non-conducting state.

When the error is no longer present at the beginning of a new frame, counter Z0 has time for the duration of 114 clock pulses or 11.4 communication bits to count down to a count below 4, so that no error signal E will be issued any more at its output. Thus, no new switching of the second switches SB of the network nodes to the non-conducting state is triggered. Corresponding fast down-counting is rendered possible to counter Z0 by priority circuit VR.

In the following description, it is assumed for the time being that no short-circuit is present between line B and system ground and that a frame interval is just present; and there are thus no potential change activities present on any of lines A and B, already for such a period of time that counter Z2 has already been reset.

At the beginning of a successive frame, i.e., a subsequent communication pulse sequence, the potential change activities on both lines A and B have the effect that up/down counter Z0 in alternating manner counts in upward and downward directions and thus does not reach a count greater than 3. Consequently, no error signal E is issued at the output Z0A thereof, either. This in turn has the result that the counting operation of counter Z2 is not released and the latter cannot reach the count at which it issues the switch control signal SC forcing the second switches SB to assume the non-conducting state.

It is assumed next that a short-circuit between line B and system ground occurs during a running frame. Due to the fact that only line A exhibits potential change activities as of that time, but not line B, only the outputs of comparators CA and CD still deliver potential change signals, but not the output of comparator CB. As a consequence thereof, counter Z0 still performs up-counting operations only. As soon as it exceeds the count of 3, it issues the error signal E at its output Z0A, which releases counter Z2 to count clock pulses INTclk. When the error signal is of longer duration than corresponds to the duration of 114 clock pulses, switch control signal SC is delivered at the output of Z2 to the second switches SB of preferably all receptive network nodes, so that all of these switches are brought to the non-conducting state. During the subsequent confirmation pulse time slot at the end of the frame in consideration, the second switches SB of these network nodes thus cannot be switched to the conducting state, so that the potential sources VK of all of these network nodes thus cannot be short-circuited to system ground. The high current pulse that would occur by switching all of these second switches SB to the conducting state during the confirmation time slot, is thus prevented.

During the running frame, counter Z1 is reset at each potential difference change signalled by comparator CD, so that it can deliver no resetting signal R to counter Z2. The switch control signal at the output of Z2 is thus maintained.

During the next frame interval, the signals resetting counter Z1 are not issued any more at the output of comparator CD, and Z1 can exceed the count of 200 and thus reset counter Z2 to an initial count of e.g., 0. Switch control signal SC at the output of Z2 thus is terminated, and the control of second switches SB of the network nodes to the non-conducting state is cancelled again.

It shall be assumed now that at the beginning of a successive further frame, the short-circuit between line B and system ground is still present. In this case, counter Z0 at the beginning of this frame again starts with an up-counting operation without receiving down-counting signals from the output of comparator CB, so that Z0 counts beyond the count of three and continues to deliver the error signal E. Z2 thus is released again to count counting clock pulses and, upon exceeding a count of 114, delivers to the second switches SB again the signal, which switches the same to the non-conducting state.

It shall be assumed now that at a new frame beginning, the short-circuit between line B and system ground is no longer present. During the preceding frame interval, counter Z1 has exceeded the count of 200 and has reset counter Z2. Counter Z0 still has a count in which it issues the error signal E. Due to the fact that again both lines A and B exhibit potential change activities, the output of both comparators CA and CB also deliver potential change pulses again so that up-counting and down-counting operations can take place again in alternating manner. As the priority circuit VR has the effect that, when both DiffA and DiffB deliver counting pulses, down-counting has priority over up-counting, rapid down-counting of counter Z0 and thus rapid termination of the error signal E at the output of Z0 take place. Counter Z2 resets during the last frame interval and thus can no longer exceed the count of 114. During this new frame counter Z2 no longer delivers the switch control signal SC at its output Z2A.

Figure 2:
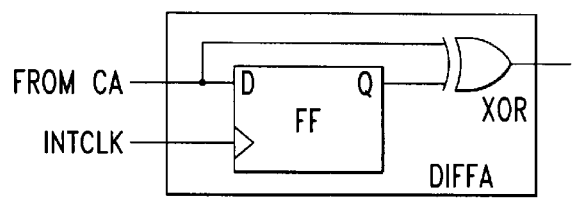
FIG. 2 shows an embodiment of a differentiating member as provided in FIG. 1.

An embodiment of a differentiating member, which can be used for DiffA, DiffB and/or DiffD, is shown in FIG. 2. Such a differentiating member is comprised of a D flipflop FF and an XOR element. A D input of flipflop FF is connected to the output of the associated one of comparators CA, CB and CD. A clock input of FF has a clock signal applied thereto, preferably the clock signal INTclk internal to the network node. A first input of the XOR element is connected to a Q output of the flipflop FF, and a second input of XOR element is connected to the D input of flipflop FF. An output of the XOR element constitutes the output of the differentiating member.

FIG. 2, in exemplary manner and representative for all three differentiating members, illustrates differentiating member DiffA, the D input of which is connected to the output of comparator CA and the output of which is connected to an input of priority circuit VR. The respective edge change coming from CA is taken over by D flipflop FF only with the respective following clock pulse INTclk and represented at the Q output of FF. Since an XOR element issues a logic value "1" or a potential H only when the two inputs thereof have different logic values applied thereto, pulses are created at the output of DiffA only during the delay period between the appearance of the respective edge change at the D input and the Q output, respectively, of FF. A differentiating member of the type shown in FIG. 2 thus obtains both a differentiation of the successive potential changes or logic value transitions and a rectification of the differentiated pulses. As a consequence thereof, each potential change or logic value transition, respectively, at the output of the respective comparator triggers a counting operation of counter Z0.

What is claimed is:

1. A monitoring circuit for a data transmission network having a plurality of transmissive and receptive network nodes and a double-line bus connecting the network nodes and serving for redundant double transmission of digital communications and having a first line and a second line via which communication pulses transferred in the form of time-spaced pulse sequences are transferred in synchronous manner in terms of time slot, the circuit comprising:

a) at least one of the network nodes is configured to confirm the reception of the respective pulse sequence by sending a confirmation pulse during a predetermined time slot that is equal for all network nodes;

b) in at least one of the network nodes the first line (A) is connected via a first resistor to a network-node-inherent operating potential source and via a first controllable switch to a reference potential source, and the second line (B) is connected via a second resistor to the reference potential source and via a controllable second switch to the operating potential source;

c) the first and second switches are configured to simultaneously switch to a non-conducting state for transmitting a communication pulse having a first logic value and to simultaneously switch to the conducting state for transmitting a communication pulse having a second logic value;

d) a potential change detector is coupled to the two lines (A, B) to monitor for the presence of potential change activities and detect a condition in which, during a pulse sequence, potential change activities occur only on the first line, but not on the second line;

e) and a first time measuring circuit is coupled to the potential change detector and is configured to measure the duration of the condition, and when a predetermined duration of such a condition is exceeded, to generate an error signal, and to cause the second switch of the at least one network node to switch to the non-conducting state.

2. The monitoring circuit of claim 1,
wherein the first time measuring circuit comprises an up/down counter that is caused to perform up-counting by potential changes on the first line signaled by the potential change detector, and to perform down-counting by potential changes on the second line signaled by the potential change detector and which issues a counter output signal serving as error signal when a predetermined count is reached.

3. The monitoring circuit of claim 2,
wherein the potential change detector comprises a first comparator and a second comparator by means of which the potential of the second line and of the first line, respectively, can be compared to a first and a second mean potential respectively, that is between an operating potential and a reference potential, and wherein the up/down counter has an up-counting input coupled to a comparator output of the second comparator and a down-counting input coupled to a comparator output of the first comparator.

4. The monitoring circuit of claim 3, further comprising a first differentiating member coupled between the first comparator and the up/down counter and a second differentiating member coupled between the second comparator and the up/down counter.

5. The monitoring circuit of claim 1, further comprising a resettable second time measuring circuit by means of which a time measurement of the error signal duration can be carried out, and which, when a predetermined error signal duration is exceeded, issues a switch control signal to cause the second switch to switch to the non-conducting state, and which can be reset to an initial state by a resetting signal.

6. The monitoring circuit of claim 5, further comprising a resettable third time measuring circuit to which changes in potential difference between the two lines are signaled, and which, at each signaled potential difference change, can be reset to an initial state, and, upon expiration of a predetermined duration since the last resetting operation, can produce a resetting signal by means of which the second time measuring circuit can be reset to an initial state.

7. The monitoring circuit of claim 6,
comprising a third comparator coupled to the first and second lines and configured to compare the potentials of the first and second lines and having a comparator output coupled to a resetting input of the third time measuring circuit.

8. The monitoring circuit of claim 7, further comprising an additional differentiating member coupled between the third comparator and the third time measuring circuit.

9. The monitoring circuit of claim 8,
wherein at least one of the differentiating members has both a differentiating and a rectifying effect.

10. The monitoring circuit of claim 9,
wherein the respective differentiating member comprises:
a D flipflop having a D input coupled to the output of the associated comparator, a clock input connected to a clock pulse source, and a Q output;
and an XOR element having a first input connected to the D input, a second input connected to the Q output, and an output constituting a differentiating member output.

11. The monitoring circuit of claim 3, further comprising, between the first and second lines and the up/down counter, a priority circuit by means of which, when potential changes occur on the first and second lines, down-counting is given priority over up-counting.

12. The monitoring circuit of claim 11,
wherein the priority circuit comprises an AND element, of which an inverting first input is connected to an output of the first differentiating member, a non-inverting second input is connected to an output of the second differentiating member, and an output is connected to the up-counting input of the up/down counter.

13. The monitoring circuit of claim 6,
wherein the second time measuring circuit comprises a second counter having a clock input connected to a counting clock source, and a counting release input having the error signal applied thereto.

14. The monitoring circuit of claim 13,
wherein the second counter has a resetting input coupled to an output of the third time measuring circuit.

15. The monitoring circuit of claim 7,
wherein the third time measuring circuit comprises a third counter having a clock input connected to a counting clock source, and a resetting input coupled with an output of the third comparator.

16. A monitoring circuit for a dual-line bus having a first line and a second line for conducting first and second signals, respectively, the circuit comprising:
a selection switch circuit for selectively coupling the second line to an operating potential source when the selection switch circuit is conductive and uncouple the second line from the operating potential source when the selection switch circuit is non-conductive;
a detector circuit having first and second inputs coupled to the first and second lines, respectively, the detector circuit configured to receive the first and second signals and to detect a line fault condition on the second line, and to generate a detection signal at a detector circuit output upon detection of the line fault condition; and
a timer circuit coupled to the detector circuit, the timer circuit configured to output an error signal to the selection switch circuit when the line fault condition on the second line is detected to render the selection switch circuit non-conductive, wherein the detector circuit comprises a first comparator coupled to the first and second lines, a second comparator coupled to the first line and a first reference voltage source, a third comparator coupled to the second line and to a second reference voltage source, and a differentiator circuit coupled to the first, second, and third comparators; and wherein the timer circuit is configured to generate an error signal when a line fault condition is detected on the second line and not when a line fault condition is detected on the first line.

17. The circuit of claim 16, wherein the differentiator circuit comprises a first differentiator, a second differentiator, and a third differentiator coupled to the first, second, and third comparators, respectively, the first, second, and third differentiators each comprise a D flipflop having a D input coupled to a respective comparator, a clock input coupled to a clock signal source, and an XOR gate having a first input coupled to the D input, a second input coupled to a Q output on the D flipflop, and an output coupled to the timer circuit.

18. The circuit of claim 17, wherein the timer circuit comprises first, second, and third timers, and wherein the first differentiator has an output coupled to the first timer that comprises a first resettable timer configured to be reset to an initial state upon changes in the output of the first comparator, and, upon a predetermined elapsed period of time since the last resetting to an initial state, to produce a reset signal; the second and third differentiators coupled to the second timer that comprises an up/down counter having an up counter input coupled to the second differentiator and a down counter input coupled to the third differentiator, and configured to perform up counting in response to output from the second differentiator and to perform down counting in response to output from the third differentiator and to generate the error signal when a predetermined count is reached; and a third timer coupled to the first and second timers and configured to measure the duration of the error signal, and, upon a predetermined elapsed period of time, to generate a switch control signal to cause the selection switch circuit to switch to the non-conducting state, and upon receipt of the reset signal from the first resettable timer, to reset to an initial state.

19. The circuit of claim 18, further comprising a priority circuit having an AND element with an inverting input coupled to the third differentiator, a non-inverting input coupled to the second differentiator, and an output coupled to the up counting input of the up/down counter, the priority circuit configured to give priority to down counting when changes occur concurrently in the first and second signals on the first and second lines after an error signal is generated.

20. A method for monitoring a circuit having a dual-line bus with a first line and a second line for conducting first and second signals, respectively, the method comprising:
comparing the first line to a first reference voltage and generating a first comparison signal;
comparing the second line to a second reference voltage and generating a second comparison signal;
converting the first comparison signal to a first countable pulse;
converting the second comparison signal to a second countable pulse;
counting the first countable pulses with one of either an up counter and a down counter in an up/down counter and counting the second countable pulses with the other of the up counter and the down counter in the up/down counter; and
generating a line fault signal when the up/down counter reaches a predetermined count in only one of the up and down counting directions.

21. The method of claim 20, further comprising detecting whether the line fault still exists and determinating the line signal when the line fault is not detected.

22. The method of claim 20, further comprising comparing the first and second signal and generating a third comparison signal; and generating a reset signal to return circuit components to an initial state after no change is detected in the third comparison signal for a predetermined period of time.

* * * * *